(12) United States Patent
Mast

(10) Patent No.: US 12,330,723 B2
(45) Date of Patent: Jun. 17, 2025

(54) SELF-POWERED TOWABLE VEHICLE

(71) Applicant: Jason Mast, Crossville, TN (US)

(72) Inventor: Jason Mast, Crossville, TN (US)

( * ) Notice: Subject to any disclaimer, the term of this patent is extended or adjusted under 35 U.S.C. 154(b) by 688 days.

(21) Appl. No.: 17/717,790

(22) Filed: Apr. 11, 2022

(65) Prior Publication Data

US 2022/0324527 A1  Oct. 13, 2022

Related U.S. Application Data

(60) Provisional application No. 63/172,851, filed on Apr. 9, 2021.

(51) Int. Cl.
| | |
|---|---|
| *B62D 59/04* | (2006.01) |
| *B60K 1/00* | (2006.01) |
| *B60K 1/04* | (2019.01) |
| *B60L 15/20* | (2006.01) |
| *B60L 15/38* | (2006.01) |

(52) U.S. Cl.
CPC ............... *B62D 59/04* (2013.01); *B60K 1/04* (2013.01); *B60L 15/20* (2013.01); *B60L 15/38* (2013.01); *B60K 2001/001* (2013.01)

(58) Field of Classification Search
CPC ..... B60K 1/04; B60K 2001/001; B60L 15/20; B60L 15/38; B62D 59/04
USPC ........................................................ 180/204
See application file for complete search history.

(56) References Cited

U.S. PATENT DOCUMENTS

| | | | | |
|---|---|---|---|---|
| 5,330,020 | A | * 7/1994 | Ketcham | ................... B60T 7/20 180/14.2 |
| 8,612,074 | B2 | 12/2013 | Minarcin et al. | |
| 8,613,583 | B1 | 12/2013 | Watkins | |
| 9,791,861 | B2 | 10/2017 | Keohane et al. | |
| 2002/0100623 | A1* | 8/2002 | Thornton | ............... B62D 59/04 180/204 |
| 2019/0322319 | A1 | 10/2019 | Smith et al. | |
| 2020/0406997 | A1 | 12/2020 | Vandergon et al. | |

FOREIGN PATENT DOCUMENTS

| | | |
|---|---|---|
| WO | 2016055816 A2 | 4/2016 |
| WO | 2020263816 A1 | 12/2020 |

* cited by examiner

*Primary Examiner* — Anne Marie M Boehler
*Assistant Examiner* — Felicia L. Brittman-Alabi
(74) *Attorney, Agent, or Firm* — Jacob M. Ward; Ward Law Office LLC

(57) ABSTRACT

A self-powered towable vehicle has an energy interconnection and distribution unit configured for electrical communication with a power source and an onboard computer of a primary vehicle. A wheel member of the self-powered towable vehicle is selectively movable between an unpowered mode and a powered mode. In the unpowered mode, the wheel member is free rotating. In the powered mode, the wheel member is driven. The energy interconnection and distribution unit is also configured to coordinate movement between the primary vehicle and the self-powered towable vehicle while the primary vehicle is moving. The self-powered towable vehicle is configured to move at a same speed as the primary vehicle when the wheel member of the self-powered towable vehicle is in the powered mode.

20 Claims, 11 Drawing Sheets

SELF-POWERED TOWABLE VEHICLE

CROSS-REFERENCE TO RELATED APPLICATIONS

This application claims the benefit of U.S. Provisional Application No. 63/172,851, filed on Apr. 9, 2021. The entire disclosure of the above application is hereby incorporated herein by reference.

FIELD

This application generally relates to powering and power transfer between power consuming vehicles, such as electric propelled towing and towed vehicles that are in motion.

INTRODUCTION

This section provides background information related to the present disclosure which is not necessarily prior art.

There is a growing need for novel power systems which can supply power to a variety of motorized vehicles and configurations of interconnected vehicles.

The number and types of battery electric vehicles, or BEVs, is increasing every day. In particular, the number of BEV-type vehicles which consume large electric power loads is increasing. In turn, there is a need for real-time delivery of sufficient power to enable safe, continuous operation of a vehicle even when it may be towing a significate load or another vehicle. Often, BEVs that are used as tow-vehicles encounter situations where the demand on the electric power is inadequate to match the output required to maintain safe highway speed. For example, a BEV may struggle while travelling up a long uphill road in tow of a heavy trailer, such as a large, multi-horse trailer. To maintain an acceptable level of speed and mobility when a towable vehicle is under tow by a towing vehicle, there is an ever-increasing need for each of the vehicles to be sufficiently powered. This is particularly pertinent for vehicles like large electric tow-vehicles which are expected to drive long distances without access to conventional power sources. Similar vehicles may be burdened by additional demands which require them to tow, pull, brake, and control the motion of a towable trailer or vehicle.

Electric car manufacturers are developing ever-increasing size and capacity batteries to provide for travel circumstances that meet the typical requirements of the driving public. As a result, modern batteries now represent a considerable portion of the entire weight of a BEV. At the same time, little or no provisions are being made for BEVs to be employed as tow vehicles. This creates numerous, potentially dangerous situations resulting in BEV owners and users overburdening the BEV. These situations frequently occur when BEVs attempt to tow a trailer, which may contribute to a failure of a user of a BEV to maintain full control of the pair of vehicles, or failure to maintain safe highway speeds. This can result in accidents, injury to the vehicle occupants, running out of fuel or energy at inconvenient locations, or, at a minimum, disruption to nearby traffic.

There is a continuing need for a comprehensive energy transfer system between BEVs, particularly BEVs which can be configured to be in electrical communication with other BEVs. BEVs typically have an internal battery storage system and excellent torque. However, BEVs are oftentimes limited in their application by their cruising ranges and the availability of power stations. Currently, there are only a handful of BEV models capable of towing heavy loads or trailers.

Desirably, BEVs should be able to provide backup or supplementary power to another BEV and potentially even tow another vehicle in an emergency. There is also a desire for BEVs which can use an internal energy storage of the BEVs to match the speed and/or braking of a lead vehicle. This kind of system design may further enable auto manufacturers to use smaller, lighter weight batteries.

SUMMARY

In concordance with the instant disclosure, BEVs able to provide backup or supplementary power to another BEV and potentially even tow another vehicle in an emergency, and which can use an internal energy storage of the BEVs to match the speed and braking of a lead vehicle, and which further enable auto manufacturers to use smaller, lighter weight batteries, has been surprisingly discovered.

In one embodiment, a self-powered towable vehicle includes a frame apparatus, a wheel member, an electric motor, and internal energy storage unit, and an energy interconnection and distribution unit. The frame apparatus has an attachment apparatus configured for attachment to a primary vehicle for towing. The primary vehicle has a power source and an onboard computer. The wheel member is rotatably attached to the frame apparatus. The electric motor is coupled to and configured to selectively drive the wheel member. The internal energy storage unit is in electrical communication with the electric motor. The energy interconnection and distribution unit is in electrical communication with the electric motor and is configured to control the electric motor and selectively drive the wheel member. The energy interconnection and distribution unit is further configured for electrical communication with the power source and the onboard computer of the primary vehicle. The wheel member is selectively movable between an unpowered mode and a powered mode. In the unpowered mode, the wheel member is free rotating. In the powered mode, the wheel member is driven. The energy interconnection and distribution unit is also configured to coordinate movement between the primary vehicle and the self-powered towable vehicle while the primary vehicle is moving. The self-powered towable vehicle is configured to move at a same speed as the primary vehicle when the wheel member of the self-powered towable vehicle is in the powered mode.

Another embodiment includes a system with a primary vehicle which tows a self-powered towable vehicle. The primary vehicle has a power source and an onboard computer. The self-powered towable vehicle can be attached to a primary vehicle through an attachment apparatus on the frame apparatus. The self-powered towable vehicle has a rotatably attached wheel member which is attached to the frame apparatus. The rotatably attached wheel member is coupled to an electric motor which selectively drives the wheel member. The electric motor is in electrical communication with an internal energy storage unit and energy interconnection and distribution unit which is configured to control the electric motor and selectively drive the wheel member. The wheel member is selectively movable between an unpowered mode and a powered mode. In the unpowered mode the wheel member is free rotating; in the powered mode the wheel member is driven by the electric motor. The energy interconnection and distribution unit is in electrical communication with the power source and onboard computer of the primary vehicle which is configured to coordinate movement between the primary vehicle and the self-powered towable vehicle. When the primary vehicle moves, the self-powered towable vehicle is configured to move at a same speed as the primary vehicle when the wheel member of the self-powered towable vehicle is in the powered mode.

In a further embodiment, a method comprising a primary vehicle with a power source and an onboard computer tows a self-powered towable vehicle. The self-powered towable vehicle has a frame apparatus with an attachment apparatus configured to be attached to a primary vehicle. The self-powered towable vehicle is attached to the primary vehicle. The self-powered towable vehicle has a wheel member rotatably attached to the frame apparatus and an electric motor coupled to and configured to selectively drive the wheel member. An internal energy storage unit on the self-powered towable vehicle is in electrical communication with the electric motor and an energy interconnection and distribution unit. The energy interconnection and distribution unit is in electrical communication with the electric motor and configured to control the electric motor and selectively drives the wheel member. The energy interconnection and distribution unit is also in electrical communication with the power source and onboard computer of the primary vehicle. The wheel member is selectively movable between an unpowered mode and a powered mode. In the unpowered mode the wheel member rotates freely; in the powered mode the wheel member is driven by the electric motor. The energy interconnection and distribution unit is also configured to coordinate movement between the primary vehicle and the self-powered towable vehicle while the primary vehicle is moving. When the primary vehicle moves, the self-powered towable vehicle is configured to move at a same speed as the primary vehicle when the wheel member of the self-powered towable vehicle is in the powered mode.

The method comprises attaching the self-powered towable vehicle to the primary vehicle which places the self-powered towable vehicle in electrical communication with the energy interconnection and distribution unit. The energy interconnection and distribution unit is in electrical communication with the power source and the onboard computer of the primary vehicle. The primary vehicle and the self-powered towable vehicle coordinate movement through the energy interconnection and distribution unit while the primary vehicle is moving. The self-powered towable vehicle moves at a same speed as the primary vehicle when the wheel member of the self-powered towable vehicle is in the powered mode.

In an exemplary embodiment, a towable electrical self-powered vehicle, also referred to herein as a powered vehicle under tow, may be configured with at least one electric powered motor coupled with at least one axle whereon at least two wheels are mounted and thereby comprises an axle-wheel assembly. The wheels and axle assembly may typically be secured to a frame member where the combination of frame, axle(s), and wheels serve to support the mass of the vehicle and allow for rolling motion, for example along a highway. The electric motor is coupled with at least one axle-wheel assembly such that electric energy provided by a storage unit is converted into mechanical energy that is transferred to at least one of the wheels that serves to provide drive power to the vehicle under tow. A battery apparatus, also referred to as an electric energy storage unit, is contained fully within the vehicle under tow that serves to provide electric energy to the motor and optionally to selected accessories, such as brake lights, running lights, turn signal lights, and the like. A signal interconnect apparatus is configured to connect to and interact with the computer of the towing vehicle and to communicate controlling commands to the vehicle under tow whereby the self-powered trailer is able to precisely mirror the velocity of the primary vehicle. The vehicle under tow may be any suitable wheeled platform that is capable of movement, for example, large semi-tractor trailers, self-contained campers, horse trailers, utility trailers, including any towable trailer of any size, carts, wagons, and other platforms capable of motion and transport. The primary vehicle may be any suitable tow vehicle capable of connecting with a self-powered vehicle under tow including, for example, passenger automobiles, pickup trucks, vans, semi-trailer trucks, farm tractors, and the like.

In yet another exemplary embodiment, an electrical self-powered towable vehicle has a) at least one frame apparatus that serves as a structural support for at least a portion of the below-described members of the vehicle under tow. The frame member serves to organize, position, support and carry the load of the various other members of the vehicle. Further, the self-powered towable vehicle may be configured to house or encase various other members and apparatus of the present invention. The electrical self-powered towable vehicle further has b) at least one extension member of the frame apparatus that is configured with an attachment apparatus to enable mechanical attachment of the vehicle under tow to a suitably configured mating apparatus on the primary vehicle and to transfer motion to the vehicle under tow. The electrical self-powered towable vehicle also has c) at least one axle member configured to mount at least one of a pair of wheels members and to enable rotation of said wheel members while the vehicle is in motion. The electrical self-powered towable vehicle has d) at least one axle member configured with an electric motor which provides drive or propulsion force to at least one of the wheel members. The electrical self-powered towable vehicle also has e) at least one axle member configured with an electric motor which provides braking force to at least one of the wheel members. The electrical self-powered towable vehicle additionally has f) at least one internal energy storage unit configured to store electric energy and supply said energy to the at least one electric motor. The electrical self-powered towable vehicle further has g) at least one energy interconnection and distribution unit configured to deliver electric energy by use of and interconnection with a suitable number of electric current carrying wires, cables, wire harnesses, and the like along with a suitable number and type of signal level wires, cables, fiber optics and the like to provide and control energy thru a suitably configured power interconnect to the at least one motor, and wherein the energy interconnection and distribution unit is further configured with control circuitry (not shown) that employs signal level circuits to control the flow of electric energy between and amongst the power source(s), the motor and the main computer of the primary vehicle. The electrical self-powered towable vehicle also has h) at least one primary vehicle-to-tow vehicle interconnect apparatus that serves to electrically connect signal level circuits and optionally some power circuits and wire harnesses that originate at the main computer of the primary vehicle to the energy interconnection and distribution unit 180 and corresponding circuits of the vehicle under tow.

In an additional embodiment, a method is provided of attaching a self-powered vehicle of the present disclosure to a primary vehicle via deployment of a suitable mechanical coupling device and a suitably configured signal/power coupling apparatus and thusly to provide electric signal and power interconnections from a main computer contained within a primary vehicle to an interconnection and distribution unit to enable coordination of control and movement between and amongst the vehicles while both are in synchronous motion.

In yet a further exemplary embodiment, a towable self-electric powered vehicle is configured with self-powering and power sharing features. In embodiments, a motorized, self-powered vehicle, such as a recreational vehicle, a utility trailer, an animal trailer, and the like, comprise an internal power source, such as a battery, battery bank, fuel cell or combinations thereof which provides power to one or more electric drive motors which provide drive energy to at least one drive wheel on the towable vehicle. The power provided is sufficient to electro-mechanically propel the towable with minimal, or even totally without supplemental power being provided by a towing vehicle and thereby serves to relieve the towing vehicle from an unwanted parasitic power burden on the towing vehicle when both are in motion. In the case where the towing vehicle is an electric vehicle (EV), and particularly when the towing vehicle is a battery powered (BEV), the towable vehicle may be configured to optionally share electric power with said BEV and in particular situations where the BEV may be overburdened and may require supplemental energy in order to maintain safe continuous operation. The combination of a self-powered, energy sharing towable and an EV towing vehicle is defined as an efficient mobile energy sharing system. A computer-based energy control and transfer apparatus is described along with methods for using said energy sharing systems.

Further areas of applicability will become apparent from the description provided herein. It should be understood that the description and specific examples are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
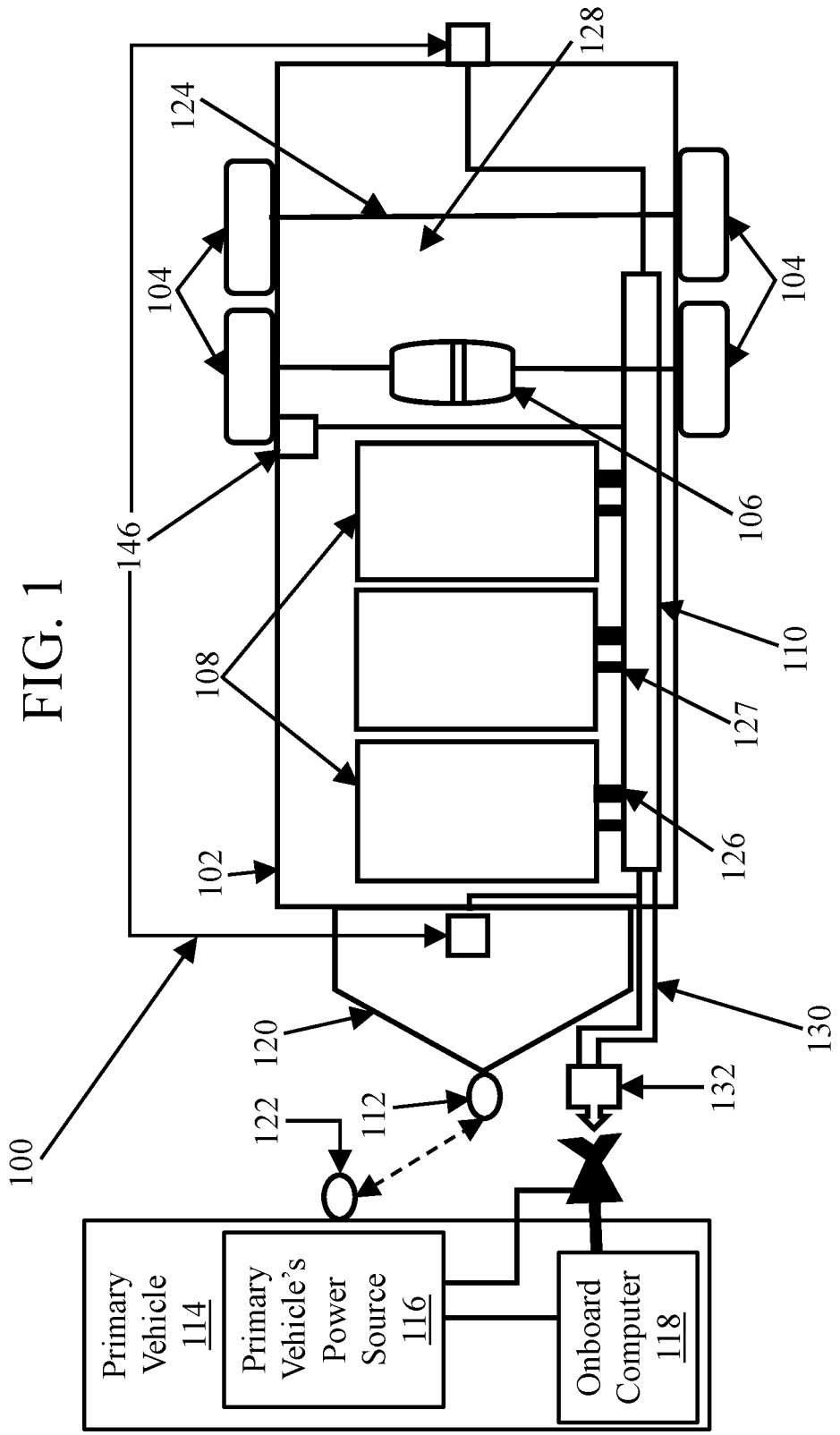
FIG. 1 is a schematic top plan view showing a self-powered towable vehicle according to one embodiment of the present disclosure.

The following description of technology is merely exemplary in nature of the subject matter, manufacture, and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments, including where certain steps can be simultaneously performed, unless expressly stated otherwise.

"A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

All documents, including patents, patent applications, and scientific literature cited in this detailed description are incorporated herein by reference, unless otherwise expressly indicated. Where any conflict or ambiguity may exist between a document incorporated by reference and this detailed description, the present detailed description controls.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a process reciting elements A, B and C specifically envisions embodiments consisting of, and consisting essentially of, A, B and C, excluding an element D that may be recited in the art, even though element D is not explicitly described as being excluded herein.

As referred to herein, all disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Before explaining some embodiments of the present invention in detail, it is to be understood that the invention is not limited in its application to the details of any particular embodiment shown or discussed herein since the invention comprises still further embodiments, which may be described by the granted claims.

The terminology used herein is for the purpose of description and not of limitation.

The term "vehicle" refers to a machine used for transporting people or goods on land such as a car, truck, bus, motorcycle, trailer, or other wheeled apparatus.

The term "primary vehicle" refers to a motorized vehicle configured to tow a second vehicle, particularly a trailer or similar vehicle.

The term "vehicle under tow" or "self-powered towable vehicle" refers to a wheeled vehicle being hauled or pulled by a primary vehicle.

The present technology, as shown in FIGS. 1-11, includes a self-powered towable vehicle 100. The self-powered towable vehicle 100 has a frame apparatus 102, a wheel member 104, an electric motor 106, an internal energy storage unit 108, and an energy interconnection and distribution unit 110. The frame apparatus 102 has an attachment apparatus 112 configured for attachment to a primary vehicle 114 for towing. The primary vehicle 114 has a power source 116 and an onboard computer 118.

As further shown in FIGS. 1-9, the wheel member 104 of the self-powered towable vehicle 100 is rotatably attached to the frame apparatus 102. The electric motor 106 of the self-powered towable vehicle 100 is coupled with the wheel member 104 and configured to selectively drive the wheel member 104. The electric motor 106 is in electrical communication with the internal energy storage unit 108 which may provide power to the electric motor 106.

The self-powered towable vehicle 100 is structurally supported by a frame apparatus 102 which is configured to organize, position, support and carry a load of various other members of the self-powered towable vehicle 100 and is configured to house or encase the various other members. One or more extension members 120 of the frame apparatus 102 is configured with an attachment apparatus 112 to enable mechanical attachment of the self-powered towable vehicle 100 to a suitably configured mating apparatus, for example, the mating apparatus 122 on a primary vehicle 114. For example, the attachment apparatus 112 may be configured with an extension member 120 which extends outwardly from a front of the frame apparatus 102.

With continued reference to FIGS. 1-5, embodiments of the self-powered towable vehicle 100 may incorporate an axle member 124 on which the wheel member 104 is mounted. The axle member 124 is attached to the electric motor 106 and enables the wheel member 104 to rotate with the axle member 124 while the primary vehicle 114 is in motion. In certain examples, one or more wheel members 104 may be mounted to one or more axle members 124 configured with an electric motor 106. The electric motor 106 may provide drive or propulsion force, braking force, and combinations thereof to the axle member 124 or to or one or more of the wheel members 104. One or more internal energy storage units 108 may be configured to store electric energy and supply energy to at least one electric motor 106.

In some embodiments, the energy interconnection and distribution unit 110 is a controller in electrical communication with the electric motor 106 and configured to control the electric motor 106 and selectively drive the wheel member 104. The energy interconnection and distribution unit 110 may be further configured for electrical communication with the power source 116 and the onboard computer 118 of the primary vehicle 114. In certain embodiments, the wheel member 104 is selectively movable between an unpowered mode and a powered mode. In the unpowered mode the wheel member 104 rotates freely; in the powered mode the wheel member 104 is driven by the power from the electric motor 106. In the powered mode, the self-powered towable vehicle 100 may be configured with the electric motor 106 to selectively provide drive or propulsion force to the wheel member 104 and the electric motor may be configured to selectively provide a braking force to the wheel member 104. In further embodiments, the self-powered towable vehicle 100 may be configured to the internal energy storage unit 108 which stores and supplies energy to the electric motor 106.

With continued reference to FIGS. 1-9, the energy interconnection and distribution unit 110 is configured to coordinate movement between the primary vehicle 114 and the self-powered towable vehicle 100 while the primary vehicle 114 is moving. The self-powered towable vehicle 100 is configured to move at a same speed as the primary vehicle 114 when the wheel member 104 of the self-powered towable vehicle 100 is in the powered mode. To accomplish this, an energy interconnection and distribution unit 110 is configured to deliver electric energy by the use of an interconnection with a suitable number of electric current carrying wires, cables, wire harnesses 126, along with a suitable number and type of signal level wires, cables, fiber optics 127 to provide and control energy through a suitably configured vehicle-to-tow vehicle interconnect apparatus 132 to one or more electric motors 106.

As further shown in FIGS. 1-5, the self-powered towable vehicle 100 contains an attachment apparatus 112 which further has an extension member 120 configured to enable mechanical attachment of the frame apparatus 102 with the primary vehicle 114 to a mating apparatus 122 of the primary vehicle 114. This allows the primary vehicle 114 to transfer motion from the primary vehicle 114 to the frame apparatus 102 through the mating apparatus 122. This allows the primary vehicle 114 to push or pull the frame apparatus 102, as desired.

In some embodiments, the self-powered towable vehicle 100 may have control circuitry 128 which may employ signal level circuits 130 configured to control a flow of electric energy through the energy interconnection and distribution unit 110. The energy interconnection and distribution unit 110 may be configured to the internal energy storage unit 108, the electric motor 106, the power source 116 of the primary vehicle 114, and the onboard computer 118 of the primary vehicle 114. This may be accomplished by configuring the energy interconnection and distribution unit 110 to deliver electric energy from the internal energy storage unit 108 or the power source 116 of the primary vehicle 114 to the electric motor 106 by one or more electric current carrying wires, cables, and wire harnesses 126.

With continued reference to FIGS. 1-5, in certain examples the circuitry 128 may be employed with the energy interconnection and distribution unit 110 to control lights, signals, and other members of the self-powered towable vehicle 100 through the signal level circuits 130. This may allow the primary vehicle onboard computer 118, the processor 140, or combinations thereof, to allow the self-powered towable vehicle 100 to mirror the movements or signals of the primary vehicle 114. In a nonlimiting example, the self-powered towable vehicle 100 may employ a primary vehicle-to-tow vehicle interconnect apparatus 132 configured to electrically connect signal level circuits 130, and optionally some power circuits and wire harnesses 126, of the onboard computer 118 of the primary vehicle 114 with the energy interconnection and distribution unit 110 and corresponding circuits of the self-powered towable vehicle 100.

Figure 2:
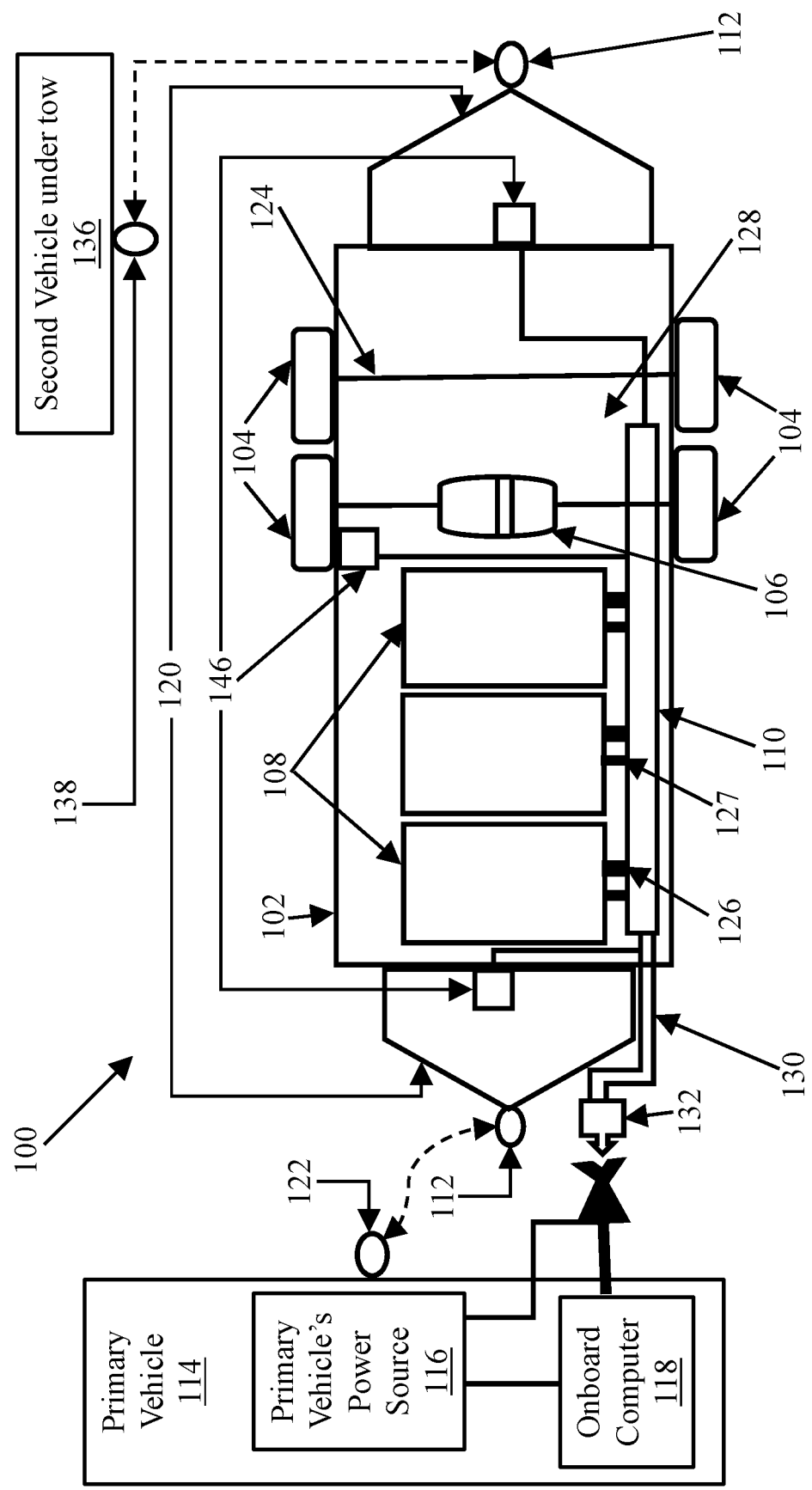
FIG. 2 is another schematic top plan view of the self-powered towable vehicle shown in FIG. 1, and further illustrating an additional extension member.
Figure 3:
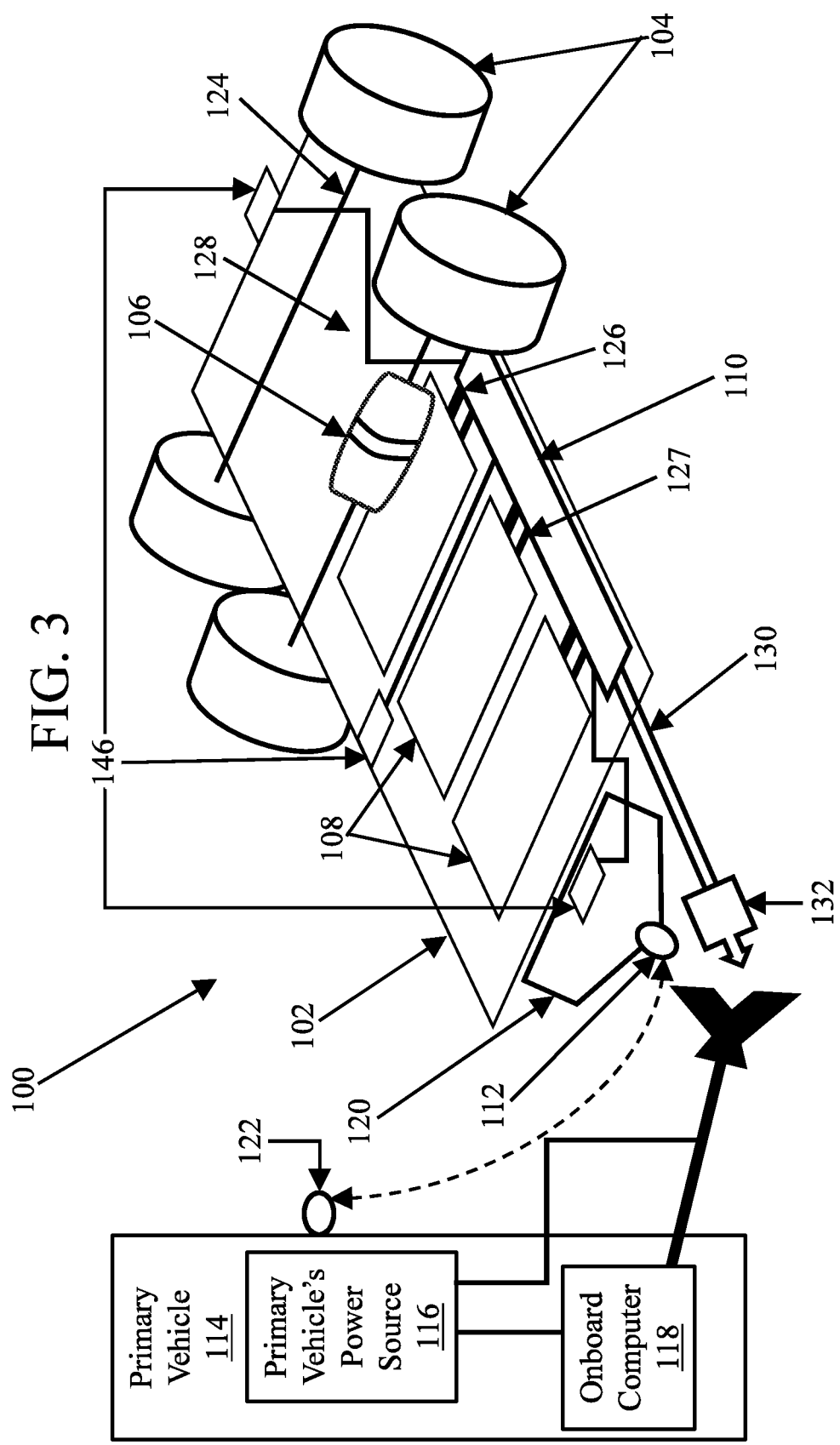
FIG. 3 is a schematic top perspective view of the self-powered towable vehicle shown in FIG. 1, according to one embodiment of the present disclosure.

Referring now to FIG. 2, the frame apparatus 102 may include first and second extension members 120. For example, certain embodiments of the self-powered towable vehicle 100 may further include a first extension member 120 extending outwardly from a front of the frame apparatus 102, and a second extension member 120 extending outwardly form a rear of the frame apparatus 102. In particular, the second extension member 120 may extend outwardly from the opposite side of the first extension member 120 on the frame apparatus 102. The primary vehicle 114 may have a suitably configured mating apparatus 122 which may be configured with the attachment apparatus 112 on the first extension member 120; the second vehicle under tow 136 may have a suitably configured mating apparatus 138 which may be configured with the attachment apparatus 112 on the second extension member 120. This enables mechanical attachment of the frame apparatus 102 to the primary vehicle 114 with the first extension member 120, and mechanical attachment of the frame apparatus 102 to the second vehicle under tow 136 with the second extension member 120. This allows motion to transfer from the primary vehicle 114 to the second vehicle under tow 136 (shown in FIG. 2) through the self-powered towable vehicle 100. This also allows for the self-powered towable vehicle 100 to transfer motion to the second vehicle under tow 136 directly, even when the motion is not provided by the primary vehicle 114 and is otherwise due to the powered movement of the self-powered towable vehicle 100 itself.

Figure 9:
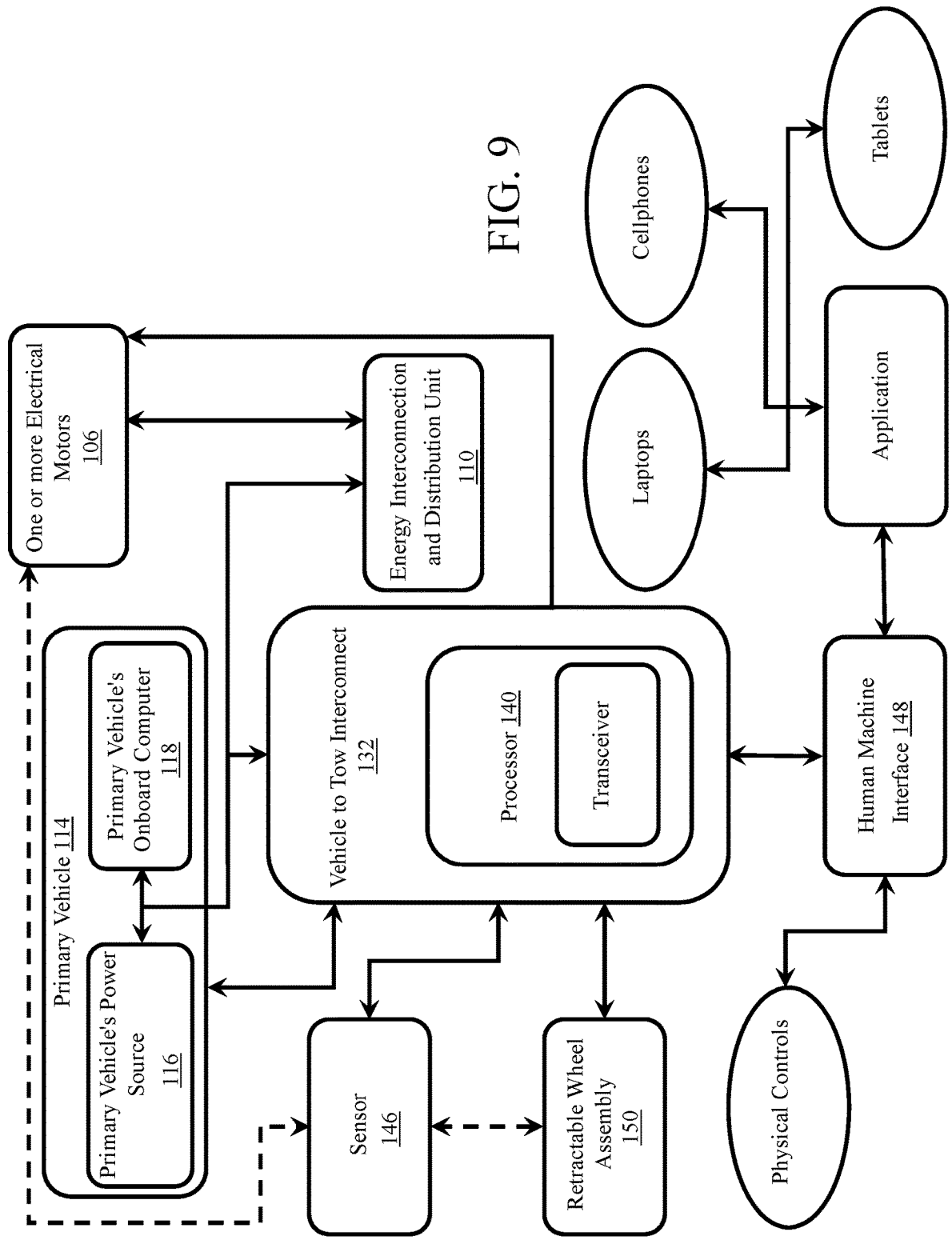
FIG. 9 is a schematic diagram showing a self-powered towable vehicle according to another embodiment of the present disclosure.
Figure 10:
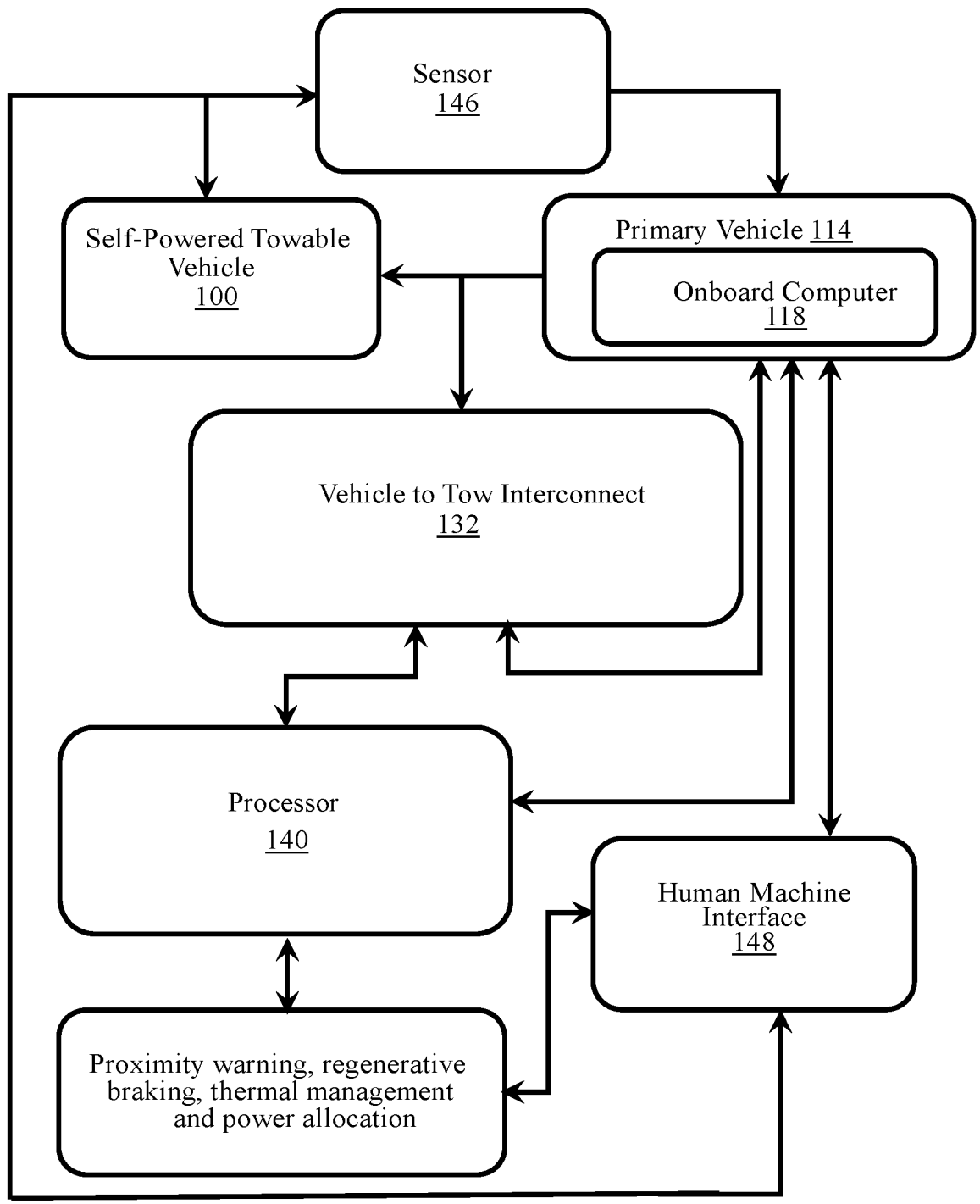
FIG. 10 is a system diagram showing a self-powered towable vehicle according to yet a further embodiment of the present disclosure.

With continued reference to FIGS. 9-10, self-powered towable vehicle 100 may include an energy interconnection and distribution unit 110 which includes a processor 140 and a tangible memory on which non-transitory processor-executable instructions are stored. The non-transitory processor-executable instructions may permit for a control of the electric motor 106 to move the frame apparatus 102 at the same speed as the primary vehicle 114 when the wheel member 104 of the self-powered towable vehicle 100 is in the powered mode. The non-transitory processor-executable instructions may be executed by the processor 140 in response to sensor 146 inputs.

Further with reference to FIGS. 1-11, the self-powered towable vehicle 100 may contain one or more sensors 146 disposed on the frame apparatus 102. The sensors 146 may include optical sensors, one or more wheel sensors, radars, electromagnetic radiation transmitters or receivers, speedometers, accelerometers, GPS, temperature gauges, wheel speed sensors, tire pressure gauges, and combinations thereof. One or more sensors 146 may be located on different parts of the vehicle including the frame apparatus 102, one or more axle members 124, the extension member of the frame apparatus 102, a retractable wheel assembly 150, one or more motors 106, one or more wheel members 104, one or more internal energy storage units 108, one or more energy interconnection and distribution units 110, and additional members as well as configurations thereof. The sensor 146 may send inputs and prompts to the onboard computer 118, control circuitry 128, the processor 140, or combinations thereof. The inputs of the sensor 146 inputs may allow the self-powered towable vehicle 100 to engage in autonomous functions such as deploying and retracting the retractable wheel assembly 150 and engaging or disengaging the retractable wheel assembly 150 with a ground surface through non-transitory processor-executable instructions.

In other embodiments, the energy interconnection and distribution unit 110 may be configured to receive inputs from one or more sensors 146. The energy interconnection and distribution unit 110 is further configured with control circuitry 128 which employs signal level circuits 130 to control the flow of electric energy between and amongst the electric motor 106, the internal energy storage unit 108, an onboard computer 118 of the primary vehicle 114, and a power source 116 of the primary vehicle 114, and combinations thereof.

With renewed reference to FIGS. 4-11, embodiments may allow the processor 140 to restrict certain autonomous functions such as deploying or retracting the retractable wheel assembly 150 if one or more of the sensors 146 determines that the self-powered towable vehicle 100 is still attached to the primary vehicle 114, or other hazard conditions exist. The hazard conditions may include proximity warnings for the primary vehicle 114 or the self-powered towable vehicle 100, warnings when deploying or retracting the retractable wheel assembly 150 would result in a collision, or when decoupling the primary vehicle 114 from the self-powered towable vehicle 100 would result in mechanical or electrical failure. Other embodiments may incorporate a warning system which displays warnings on the onboard computer 118, or other human-machine interface (HMI) controls 148. In a similar vein, one or more sensors 146 may be used to autonomously regulate the speed of the vehicle and to provide warnings to the users. The sensor 146 may accomplish autonomous regulation through the onboard computer 118, control circuitry 128, the processor 140, or combinations thereof. In a further embodiment, one or more sensors 146 may allow the onboard computer 118, control circuitry 128, the processor 140, or combinations thereof to regulate the acceleration, movement, and braking of the self-powered towable vehicle 100. Advantageously, the self-powered towable vehicle 100, the primary vehicle 114, and the second vehicle under tow 136 may be configured to share input data from sensor 146 inputs to provide better autonomous regulation.

In a nonlimiting example, the sensor 146 may trigger warnings for: imminent collisions; low tire pressure in the self-powered towable vehicle 100; overheating of the internal energy storage unit 108; brake failure; when deploying the retractable wheel assembly 150 may result in collision; and combinations thereof. In certain embodiments, the sensor 146 inputs may trigger autonomous braking for the self-powered towable vehicle 100. In a further embodiment, the self-powered towable vehicle 100 may use one or more sensors 146 to automatically maintain a buffer distance between other vehicles or objects.

Referring now to FIGS. 4-9, certain embodiments of the self-powered towable vehicle 100 may have a retractable wheel assembly 150 which is attached to the frame apparatus 102 and coupled to an additional wheel member 104. The additional wheel member 104 may be free rotating, or selectively free rotating and coupled to an electric motor 106. The additional wheel member 104 may be disposed on the end of the retractable wheel assembly 150 furthest from where it is attached to the frame apparatus 102.

Figure 4:
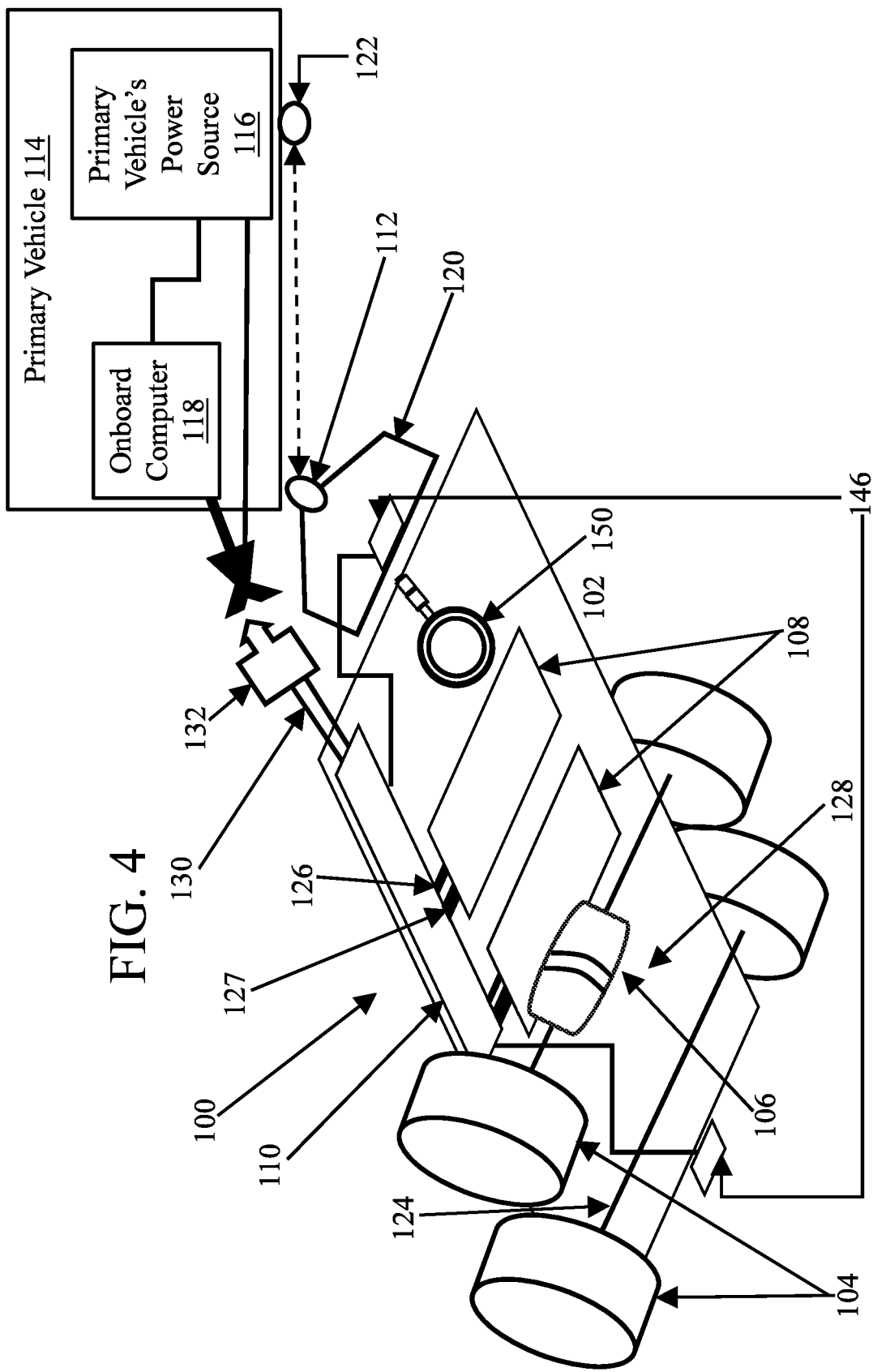
FIG. 4 is a schematic bottom perspective view of the self-powered towable vehicle shown in FIG. 3, and further illustrating a retractable wheel assembly in a retracted position.
Figure 5:
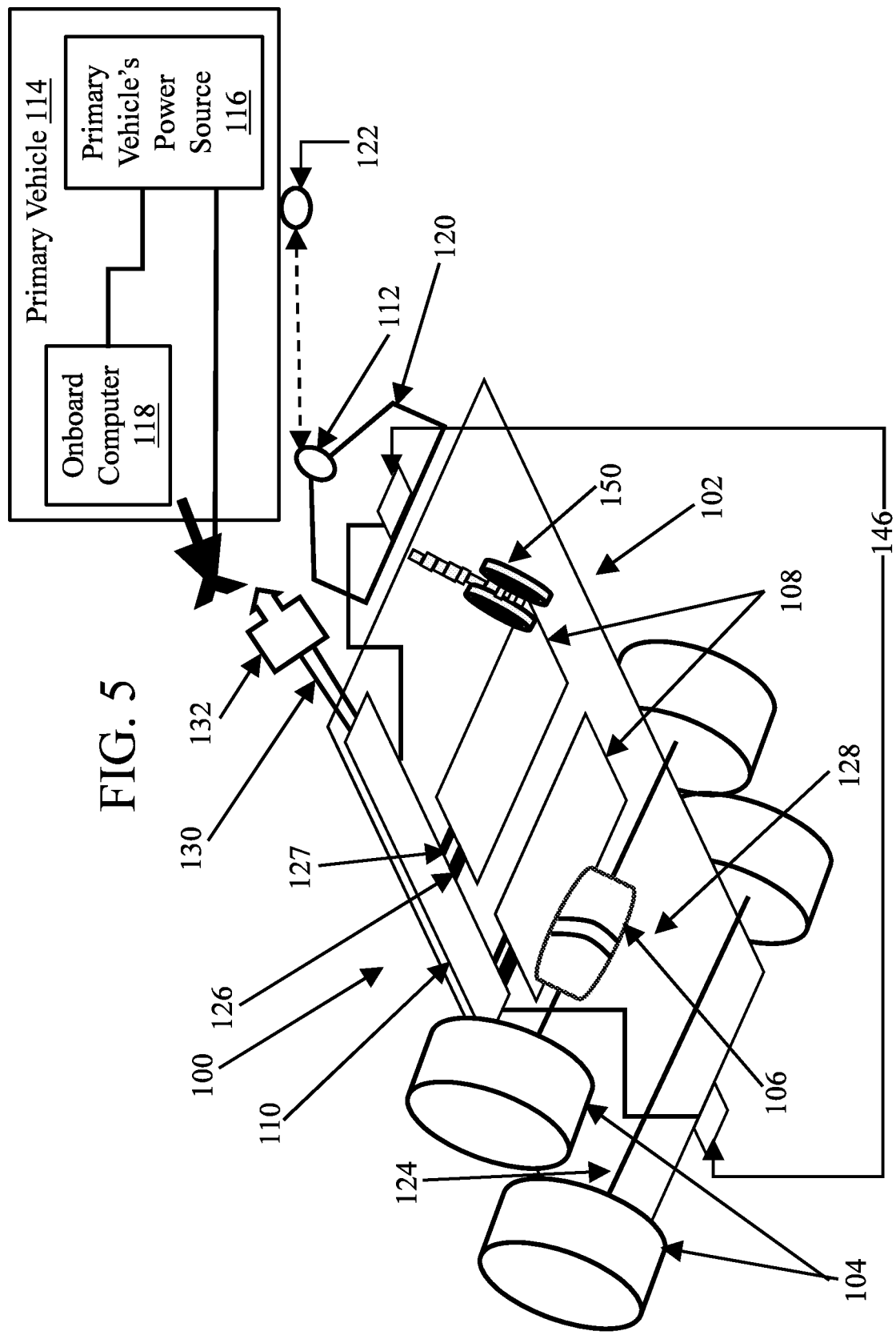
FIG. 5 is another schematic bottom perspective view of the self-powered towable vehicle shown in FIG. 3, and further illustrating the retractable wheel assembly in a deployed position.
Figure 6:
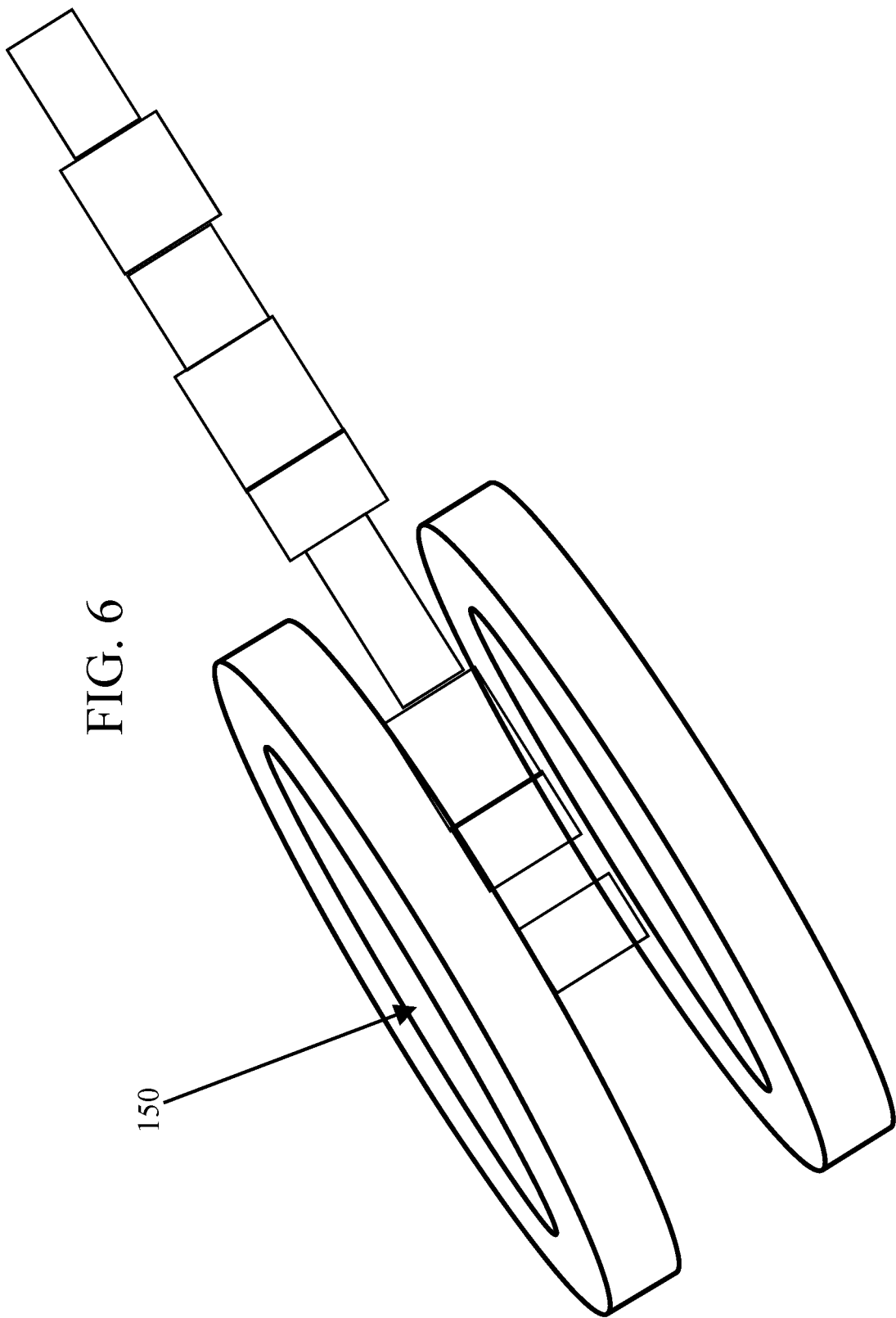
FIG. 6 is an enlarged perspective view of the retractable wheel assembly shown in FIGS. 4-5, according to one embodiment of the present disclosure.
Figure 7:
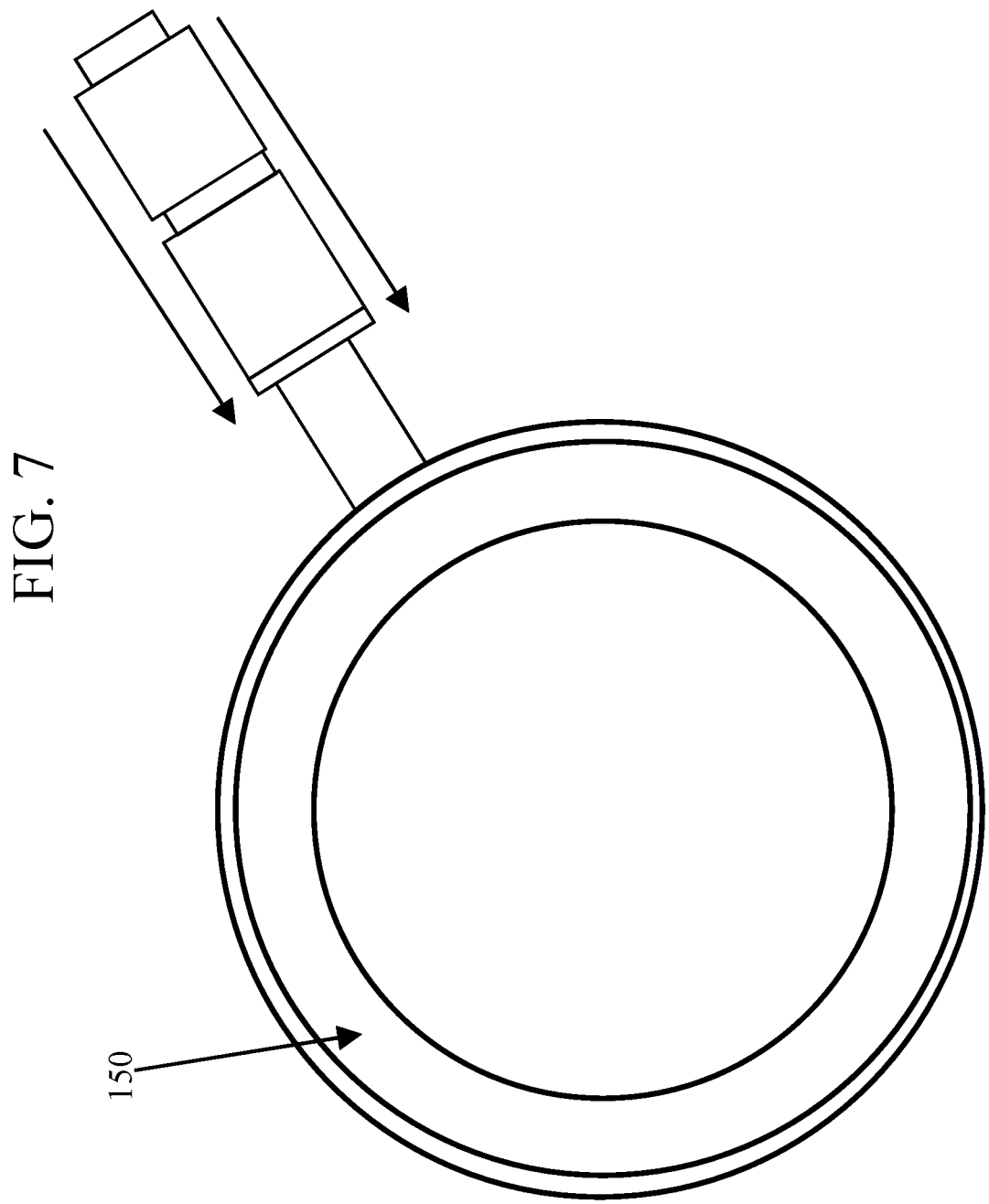
FIG. 7 is an enlarged side elevational view of the retractable wheel assembly shown in FIG. 6, and further illustrating the retractable wheel assembly in the retracted position.
Figure 8:
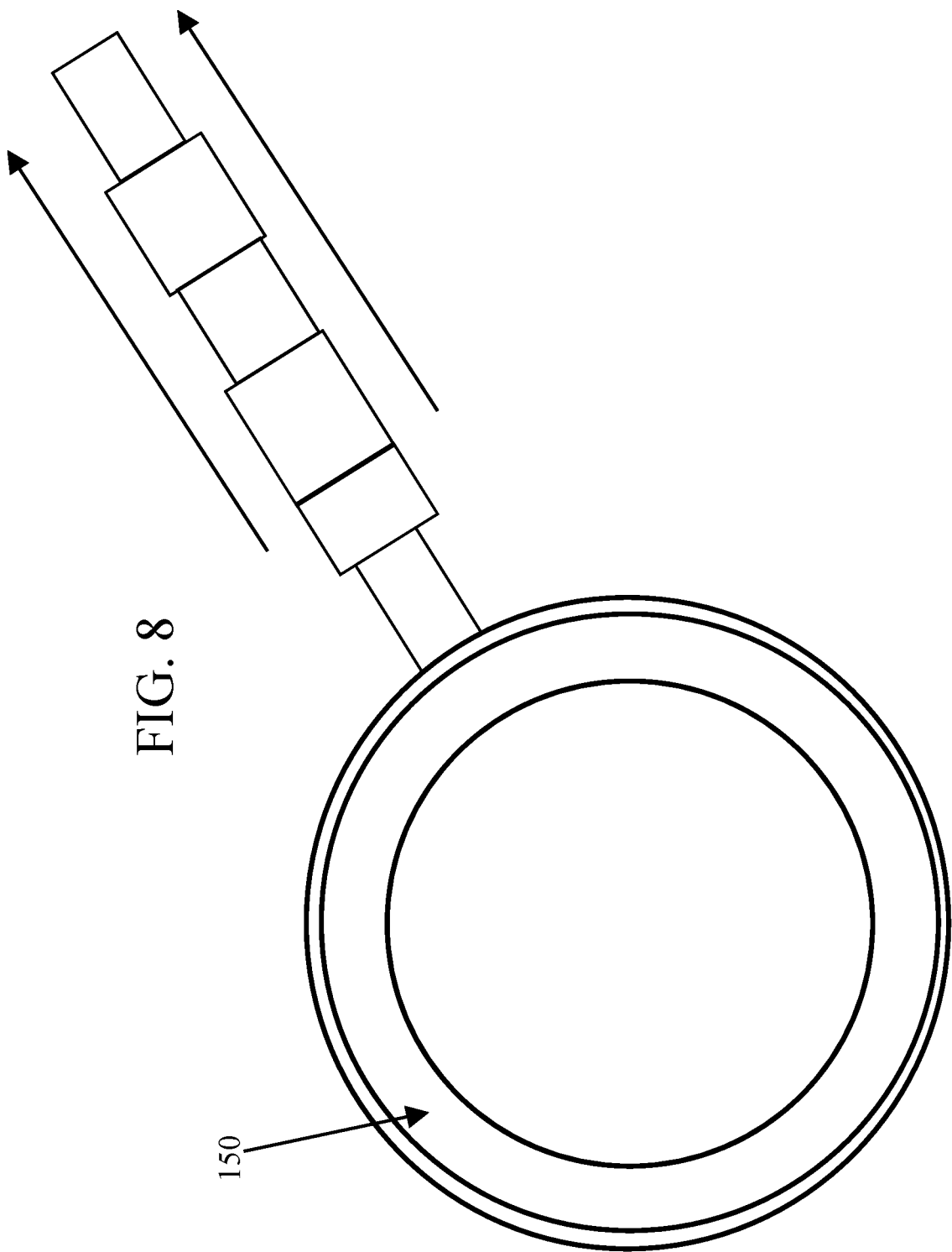
FIG. 8 is an enlarged side elevational view of the retractable wheel assembly shown in FIG. 6, and further illustrating the retractable wheel assembly in the deployed position.

The retractable wheel assembly 150 may have a telescopic portion, allowing the retractable wheel assembly 150 to extend from a retracted position to allow the wheel member 104 to engage a ground surface. FIGS. 4 and 7 contains views of the retractable wheel assembly 150 with a retracted telescopic portion. FIGS. 5-6, and 8 contain views of the retractable wheel assembly 150 with a deployed telescopic portion. In particular, the retractable wheel assembly 150 is configured to move between the retracted position and the deployed position, with the additional wheel member 104 being spaced apart from the ground surface in the retracted position, and the additional wheel member 104 engaging with the ground surface in the deployed position. Means other than the telescopic portion for selectively moving the retractable wheel assembly 150 between the retracted position and the deployed position, for example, hinged or rotating arrangements, may also be employed within the scope of the present disclosure.

With continued reference to FIGS. 4-9, certain embodiments of the retractable wheel assembly 150 is coupled to one or more wheel members 104 and the frame apparatus 102. The wheel members 104 may incorporate a number of configurations and embodiments that would be evident to one of ordinary skill in the art. For example, a single wheel, two wheels, a set of four wheels, etc. The retractable wheel assembly 150 may be coupled to the frame apparatus 102 by a hinge, pivot, or any number of mechanical joints and couplings. The retractable wheel assembly 150 may be extended and/or deployed using electrical power from the self-powered towable vehicle 100 and the internal energy storage unit 108 the power source 116 of the primary vehicle 114, hydraulic pressure, or a combination thereof. The retractable wheel assembly 150 may allow the self-powered towable vehicle 100 to lift the frame apparatus 102, thereby shifting the weight of the self-powered towable vehicle 100, and lifting the front of the frame apparatus 102.

With continued reference to FIG. 4-5, embodiments of the retractable wheel assembly 150 may hinge and pivot from the frame apparatus 102. Certain embodiments may allow the retractable wheel assembly 150 and the wheel member 104 to hinge or pivot at the end attached to the frame apparatus 102. In other embodiments, the retractable wheel assembly may nest into the bottom of the frame apparatus 102 to improve overall vehicle function, compactness, and/or aerodynamics while the self-powered towable vehicle 100 is in motion.

The self-powered towable vehicle 100 may have a rotary cam coupled to the wheel member 104 of the retractable wheel assembly 150 which allows the wheel member 104 to pivot. Certain embodiments may couple the retractable wheel assembly 150 with a rotary cam. In a non-limiting example, the rotary cam may be configured with the onboard computer 118, control circuitry 128, or the processor 140 to turn the wheel of the retractable wheel assembly 150. In a further embodiment, non-transitory processor-executable instructions may allow the retractable wheel assembly 150 turn the wheel member 104 as it retracts to allow the wheel member 104 to nest into the frame apparatus 102. In a nonlimiting example, the rotary cam coupled to the retractable wheel assembly 150 or the wheel member 104 on the retractable wheel assembly 150 may be programmed to turn automatically when the retractable wheel assembly 150 is retracted. In further examples, the wheel member 104 on the retractable wheel assembly 150 may turn 90 degrees relative to the pivot axis of the rotary cam, making the inner diameter of the wheel substantially parallel to the frame apparatus 102. The non-transitory processor-executable instructions may allow the retractable wheel assembly 150 to attain more aerodynamic configurations.

With continued reference to FIGS. 1-11, the non-transitory processor-executable instructions of the self-powered towable vehicle 100 may be configured to cause the electric motor to move the frame apparatus 102 in response to control commands. In certain examples, the self-powered towable vehicle 100 may contain an HMI control 148 which may be communicatively configured with the energy interconnection and distribution unit 110, allowing the user to move the frame apparatus 102 by operating the electric motor 106. The HMI control 148 may take the form of physical controls such as a remote, controller, a panel on the self-powered towable vehicle 100, and combinations thereof. In other embodiments, the HMI control 148 may be virtual and accessible through the onboard computer 118, mobile devices, laptops, cellphones, tablets, remotes, and other programmable devices. In certain examples, the HMI control 148 of the self-powered towable vehicle 100 may be configured to use both physical controls and wireless devices. In certain examples, the HMI control 148 of the self-powered towable vehicle 100 may be configured to receive signals from one or more sensor 146.

In a further embodiment, a user may steer the self-powered towable vehicle 100 without the aid of a primary vehicle 114 by deploying the retractable wheel assembly 150 and actuating the rotary cam. The rotary cam may be actuated by the processor 140 of the self-powered towable vehicle 100 which may be operated by the HMI control 148. Once one or more wheel members 104 of the retractable wheel assembly 150 are deployed, the HMI control may permit a user to move the self-powered towable vehicle 100 by causing the electric motor 106 to move and steer by controlling one or more actuators in the retractable wheel assembly 150. For example, the user may steer the self-powered towable vehicle 100 when disconnected from the primary vehicle 114 into a parked position set apart from the primary vehicle 114.

Referring now to FIGS. 1-5 and 9-10, in nonlimiting examples the processor 140 may be coupled or merged with the energy connection and distribution unit 110 or the vehicle-to-tow interconnect apparatus 132. Similarly, a transceiver may be coupled or merged with the energy interconnection and distribution unit 110, processor 140, sensor 146, retractable wheel assembly 150, or physical controls. In some embodiments, an HMI control 148 may be communicatively coupled through wireless means to the sensor 146, the self-powered towable vehicle 100, the primary vehicle 114, the second vehicle under tow 136, and combinations thereof. This may be accomplished through a transceiver on the processor 140 which may utilize Wi-Fi networks, cellular networks, Bluetooth, local area networks (LAN), wide area networks (WAN) and other forms of wireless communication. The wireless communication may be interconnected directly or through the use of an application. Devices including laptops, cellphones, tablets, remotes, and other programmable devices may be used to communicate with the processor 140.

Certain embodiments may enable the user to select different energy settings and configurations which prioritize the battery life of the self-powered towable vehicle 100 or the primary vehicle 114. In further embodiments, the user may be able to obtain specific readouts from the sensor 146 on the self-powered towable vehicle 100 including a temperature of the internal energy storage unit 108, the temperature within the self-powered towable vehicle 100, the wheel speed of one or more of the wheel members 104, as well as other inputs from the sensor 146. The application may allow the user to view the sensor 146 inputs in real time. Certain nonlimiting examples may allow the user to contemporaneously view the sensor inputs through the onboard computer 118, mobile devices, laptops, cellphones, tablets, remotes, and other programmable devices. This may allow users to drive the self-powered towable vehicle 100 through the application or through other wireless or electrical connections.

With continued reference to FIGS. 1-5 and 9-10, further embodiments may allow the users to use the application to program and download specific modes which are tailored to specific geographic locations, climate conditions, energy conservation, and combinations thereof. In a nonlimiting example, the sensor 146 may trigger non-transitory processor-executable instructions for users driving through hot climates to regulate thermal management or enforce safeguards for thermal management. Users may program certain steps which may allow the self-powered towable vehicle 100 to use inputs from the sensor 146 to decouple the self-powered towable vehicle 100 from the primary vehicle 114. In further embodiments, the self-powered towable vehicle 100 may be able to decouple from the primary vehicle 114 and autonomously move to a separate location.

In a further exemplary embodiment, one or more electric motors 106 coupled to the regenerative braking system allows the self-powered towable vehicle 100 to convert the torque from braking to charge the internal energy storage unit 108 or the power source 116 of the primary vehicle 114. Other embodiments may couple one or more electric motors 106 to one or more axle members 124 of the self-powered towable vehicle 100 to convert the torque to electrical energy through physical or hydraulic energy. This may be accomplished through the use of electro-mechanical braking actuators which act as generators, converting the braking force into electromagnetic force, converting the energy back into electrical energy, and storing the energy in the internal energy storage unit 108, or the power source 116. In another nonlimiting embodiment, the braking system is a combined system which utilizes both regenerative and conventional braking. Certain embodiments may use the onboard computer 118 or a processor 140 on the self-powered towable vehicle 100 to regulate the braking system. These embodiments may be controlled by an HMI control 148 or regulated through inputs from the sensor 146 which may monitor and maintain proximity through radar, electromagnetic energy transmitters, optical inputs, and combinations thereof.

In some embodiments, the processor 140 may control the energy interconnection and distribution unit 110 to shift between conventional braking, which utilizes friction, and regenerative braking. The self-powered towable vehicle 100 may be configured with an electric motor 106 to selectively provide regenerative braking to one or more wheel members 104 or the axle member 124. In a nonlimiting example, a regenerative braking system utilizing the energy interconnection and distribution unit 110 may maximize energy capture to either the internal energy storage unit 108 or the power source 116. Varying the energy capture allows users to implement power plans which may provide greater fuel economy or greater vehicle range.

With continued reference to FIGS. 1-5 and 9-10, the processor 140 and the energy interconnection and distribution unit 110 may also be configured to charge the power source 116 from one or more of the internal energy storage units 108 of the self-powered towable vehicle 100. In certain embodiments, the processor 140 or the primary vehicle onboard computer 118 may also take inputs from one or more sensors 146 to engage the physical brake. This may occur in instances in the event of a failure in the brake system of the primary vehicle 114, overheating of the internal energy storage unit 108 of the self-powered towable vehicle 100, a failure in the regenerative braking system, as well as other situations in which one or more sensors 146 detect a dangerous condition. For instance, a wheel speed sensor 146 may provide information to the processor 140 or the primary vehicle onboard computer 118 which indicates that one or more wheel members 104 are slipping or accelerating when the primary vehicle 114 is engaging the brakes. Certain embodiments may automatically switch the mode of the self-powered towable vehicle 100 to the unpowered mode in response to certain conditions, enabling the user to drive the self-powered towable vehicle like a typical trailer.

A self-powered towable vehicle 100 may contain an attachment apparatus 112 allowing the self-powered towable vehicle 100 to attach to a primary vehicle 114 and second vehicle under tow 136. Embodiments of the self-powered towable vehicle 100 may encompass a combination of the following: a retractable wheel means, a load carrying portion, and fixing means. The fixing means may include means for releasably fastening the self-powered towable vehicle 100 to a primary vehicle 114 or a second vehicle under tow 136. Advantageously, the means for releasably fastening may be configured to release through the use of electromagnetic signals, electric locks, and electromagnets. This process may be facilitated by the onboard computer 118, control circuitry 128, the processor 140, the sensor 146, HMI control 148, and combinations thereof. In certain examples, the process of releasably fastening vehicles may be executed in response to inputs from the sensor 146 which trigger non-transitory processor-executable instructions. For example, this process may be executed by GPS inputs, hazardous conditions, yaw-rate sensors, wheel speed sensors, accelerometers, and combinations thereof.

With continued reference to FIGS. 1-5 and 9-10, some embodiments may allow one or more internal energy storage units 108 to be charged independently from the self-powered towable vehicle 100. Other embodiments may also allow one or more internal energy storage units 108 to be charged directly through the self-powered towable vehicle 100. Certain embodiments may allow the user to charge the self-powered towable vehicle 100, one or more of the internal energy storage units 108, and combinations thereof through conventional means such as 30 Amp 120-volt plugs. In a nonlimiting example, users may charge the self-powered towable vehicle 100 and use the internal energy storage unit 108 as a battery bank for the primary vehicle 114 or as a converter. Other embodiments may utilize solar power for passive charging. Further embodiments may contain onboard generators that allow the self-powered towable vehicle 100 to charge by converting gasoline, diesel, propane, natural gas, other fuels, and combinations thereof.

Figure 11:
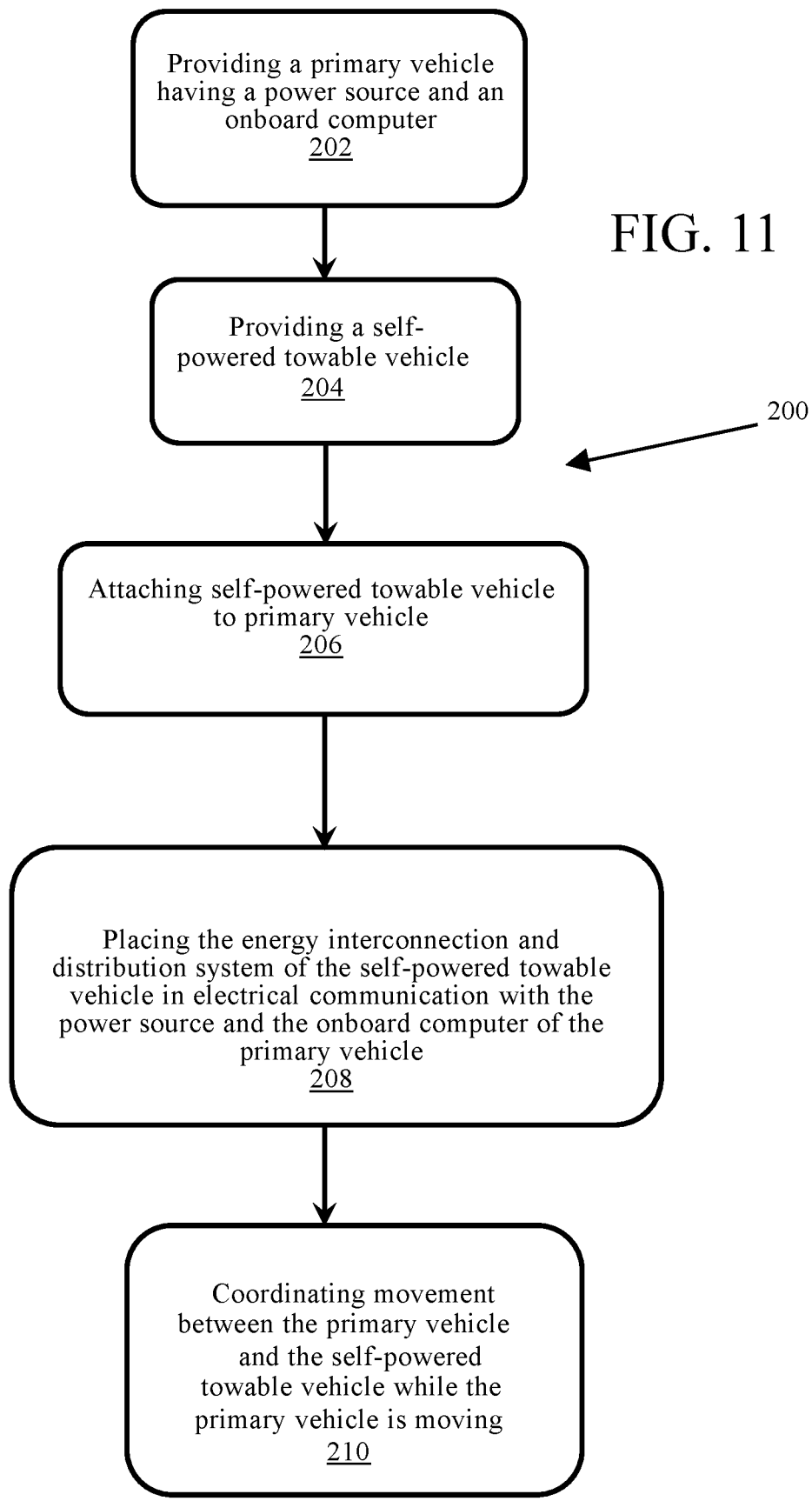
FIG. 11 is a flow diagram showing a method for operating a self-powered towable vehicle according to one embodiment of the present disclosure.

As illustrated in FIG. 11, a method 200 for using the self-powered towable vehicle 100 is shown. The method 200 includes a first step 202 of providing the primary vehicle 114 with the power source 116 and the onboard computer 118. The method further includes a second step 204 of providing the self-powered towable vehicle 100 with the frame apparatus 102 having the attachment apparatus 112 configured for attachment to the primary vehicle 114 with the power source 116 for towing, for example, as shown in FIGS. 1-5. The self-powered towable vehicle 100 of the second step 204 further includes the wheel member 104 rotatably attached to the frame apparatus 102, an electric motor 106 coupled to and configured to selectively drive the wheel member 104, the internal energy storage unit 108 in electrical communication with the electric motor 106, and the energy interconnection and distribution unit 110.

As established hereinabove, with reference to FIGS. 1-5, the energy interconnection and distribution unit of the self-powered towable vehicle 100 in the second step 204 is in electrical communication with the electric motor 106 and configured to control the electric motor 106 and selectively drive the wheel member 104. The energy interconnection and distribution unit 110 of the self-powered towable vehicle 100 of the second step 204 is further configured for electrical communication with the power source 116 and the onboard computer 118 of the primary vehicle 114. The wheel member 104 of the self-powered towable vehicle 100 in the second step 204 is selectively movable between the powered mode and the unpowered mode. In the powered mode the wheel member 104 is driven, and in the unpowered mode the wheel member 104 is free rotating.

With renewed reference to FIG. 11, the method 200 also includes a third step 206 of attaching the self-powered towable vehicle 100 to the primary vehicle 114. The method 200 may then further include a fourth step 208 of placing the energy interconnection and distribution unit 110 of the self-powered towable vehicle 100 in electrical communication with the power source 116 and the onboard computer 118 of the primary vehicle 114. The method 200 can additionally include a fifth step 210 of coordinating the movement between the primary vehicle 114 and the self-powered towable vehicle 100 while the primary vehicle 114 is moving. During the fifth step 210, the self-powered towable vehicle 100 moves at the same speed as the primary vehicle 114 when the wheel member 104 of the self-powered towable vehicle 100 is in the powered mode. It should be appreciated that additional steps associated with the method 200 consistent with the operation of the self-powered towable vehicle 100 as set forth hereinabove are contemplated, and considered to be within the scope of the present disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions, and methods can be made within the scope of the present technology, with substantially similar results.

While certain representative embodiments and details have been shown for purposes of illustrating the invention, it will be apparent to those skilled in the art that various changes may be made without departing from the scope of the disclosure, which is further described in the following appended claims.

What is claimed is:

1. A self-powered towable vehicle, comprising:
   a frame apparatus having an attachment apparatus configured for attachment to a primary vehicle for towing, the primary vehicle having a power source and an onboard computer;
   a wheel member rotatably attached to the frame apparatus;
   an electric motor coupled to and configured to selectively drive the wheel member;

an internal energy storage unit in electrical communication with the electric motor; and an energy interconnection and distribution unit in electrical communication with the electric motor and configured to control the electric motor and selectively drive the wheel member, the energy interconnection and distribution unit further configured for electrical communication with the power source and the onboard computer of the primary vehicle, wherein the wheel member is selectively movable between an unpowered mode and a powered mode, and in the unpowered mode the wheel member is free rotating, and in the powered mode the wheel member is driven, and wherein the energy interconnection and distribution unit is also configured to coordinate movement between the primary vehicle and the self-powered towable vehicle while the primary vehicle is moving, whereby the self-powered towable vehicle is configured to move at a same speed as the primary vehicle when the wheel member of the self-powered towable vehicle is in the powered mode.

2. The self-powered towable vehicle of claim 1, wherein the attachment apparatus further has an extension member configured to enable mechanical attachment of the frame apparatus with the primary vehicle to a mating apparatus of the primary vehicle and to transfer motion from the primary vehicle to the frame apparatus.

3. The self-powered towable vehicle of claim 1, further comprising an axle member on which the wheel member is mounted, the axle member attached to the electric motor and enabling rotation of the wheel member while the primary vehicle is in motion.

4. The self-powered towable vehicle of claim 1, wherein the electric motor is configured for selectively providing drive or propulsion force to the wheel member.

5. The self-powered towable vehicle of claim 1, wherein the electric motor is configured for selectively providing a braking force to the wheel member.

6. The self-powered towable vehicle of claim 1, wherein the internal energy storage unit is configured for storing and supplying energy to the electric motor.

7. The self-powered towable vehicle of claim 1, wherein the energy interconnection and distribution unit is configured to deliver electric energy from the internal energy storage unit to the electric motor by one or more electric current carrying wires, cables, and wire harnesses.

8. The self-powered towable vehicle of claim 1, wherein the energy interconnection and distribution unit has control circuitry that employs signal level circuits configured to control a flow of electric energy between the internal energy storage unit, the electric motor, the power source of the primary vehicle, and the onboard computer of the primary vehicle.

9. The self-powered towable vehicle of claim 1, further comprising a primary vehicle-to-tow vehicle interconnect apparatus configured to electrically connect signal level circuits, and optionally some power circuits and wire harnesses, of the onboard computer of the primary vehicle with the energy interconnection and distribution unit and corresponding circuits of the self-powered towable vehicle.

10. The self-powered towable vehicle of claim 9, wherein the frame apparatus further includes a first extension member on which the attachment apparatus is disposed, the first extension member extending outwardly from a front of the frame apparatus.

11. The self-powered towable vehicle of claim 10, wherein the frame apparatus further includes a second extension member, the second extension member extending outwardly from a rear of the frame apparatus and enabling mechanical attachment of the frame apparatus to a suitably configured mating apparatus on a second vehicle under tow to transfer motion to the second vehicle under tow.

12. The self-powered towable vehicle of claim 1, wherein the energy interconnection and distribution unit includes a processor and a tangible memory on which non-transitory processor-executable instructions are stored, the non-transitory processor-executable instructions permitting for a control of the electric motor to move the frame apparatus at the same speed as the primary vehicle when the wheel member of the self-powered towable vehicle is in the powered mode.

13. The self-powered towable vehicle of claim 12, further comprising at least one sensor disposed on the frame apparatus.

14. The self-powered towable vehicle of claim 13, further comprising a human-machine interface (HMI) control in communication with the energy interconnection and distribution unit, the HMI control permitting a user to cause the electric motor to move the frame apparatus.

15. The self-powered towable vehicle of claim 14, wherein the non-transitory processor-executable instructions are further configured for causing the electric motor to move the frame apparatus in response to control commands.

16. The self-powered towable vehicle of claim 15, wherein the HMI control is configured to receive signals from at least one sensor.

17. The self-powered towable vehicle of claim 16, further comprising:
a retractable wheel assembly having a first end and a second end, with an additional wheel member disposed on the first end, and the second end attached to the frame apparatus, the retractable wheel assembly further including a telescopic portion allowing the retractable wheel assembly to move between a retracted position and a deployed position, with the additional wheel member being spaced apart from a ground surface in the retracted position, and the additional wheel member engaging with the ground surface in the deployed position.

18. The self-powered towable vehicle of claim 17, wherein the non-transitory processor-executable instructions are further configured for causing the electric motor to selectively move the retractable wheel assembly between the retracted position and the deployed position.

19. A system, comprising:
a primary vehicle for towing, the primary vehicle having a power source and an onboard computer; and
a self-powered towable vehicle attached to the towing vehicle, the self-powered towable vehicle including a frame apparatus having an attachment apparatus configured for attachment to a primary vehicle for towing, a wheel member rotatably attached to the frame apparatus, an electric motor coupled to and configured to selectively drive the wheel member, an internal energy storage unit in electrical communication with the electric motor; and an energy interconnection and distribution unit in electrical communication with the electric motor and configured to control the electric motor and selectively drive the wheel member, the energy interconnection and distribution unit further being in electrical communication with the power source and onboard computer of the primary vehicle, wherein the wheel member is selectively movable between an unpowered mode and a powered mode, and in the unpowered mode the wheel member is free rotating, and in the powered mode the wheel member is driven, and wherein the energy interconnection and distribution unit is also configured to coordinate movement between the primary vehicle and the self-powered towable vehicle while the primary vehicle is moving, whereby the self-powered towable vehicle is configured to move at a same speed as the primary vehicle when the wheel member of the self-powered towable vehicle is in the powered mode.

20. A method, comprising:

providing a primary vehicle for towing, the primary vehicle having a power source and an onboard computer;

providing a self-powered towable vehicle including a frame apparatus having an attachment apparatus configured for attachment to a primary vehicle for towing, the primary vehicle having a power source, a wheel member rotatably attached to the frame apparatus, an electric motor coupled to and configured to selectively drive the wheel member, an internal energy storage unit in electrical communication with the electric motor, and an energy interconnection and distribution unit in electrical communication with the electric motor and configured to control the electric motor and selectively drive the wheel member, the energy interconnection and distribution unit further configured for electrical communication with the power source and onboard computer of the primary vehicle, wherein the wheel member is selectively movable between a powered mode and an unpowered mode, and in the powered mode the wheel member is driven, and in the unpowered mode the wheel member is free rotating;

attaching the self-powered towable vehicle to the primary vehicle;

placing the energy interconnection and distribution unit of the self-powered towable vehicle in electrical communication with the power source and the onboard computer of the primary vehicle; and coordinating movement between the primary vehicle and the self-powered towable vehicle while the primary vehicle is moving, whereby the self-powered towable vehicle moves at a same speed as the primary vehicle when the wheel member of the self-powered towable vehicle is in the powered mode.

* * * * *